US 6,556,175 B2

(12) United States Patent
Okamura et al.

(10) Patent No.: US 6,556,175 B2
(45) Date of Patent: Apr. 29, 2003

(54) NON-CONTACT TYPE IC CARD, ANTENNA AND ANTENNA FRAME FOR IC CARD (75) Inventors: Shigeru Okamura, Nagano (JP); Tomoharu Fujii, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 0 days.

(21) Appl. No.: 09/940,570

(22) Filed: Aug. 28, 2001

(65) Prior Publication Data
US 2002/0024475 A1 Feb. 28, 2002

(30) Foreign Application Priority Data
Aug. 31, 2000 (JP) .......................................... 2000-263855

(51) Int. Cl.⁷ ................................................. H01Q 1/36
(52) U.S. Cl. ........................ 343/895; 343/873; 257/531
(58) Field of Search ................................ 343/895, 873, 343/700 MS; 257/531, 679, 790; 340/572; H01Q 1/36

(56) References Cited

U.S. PATENT DOCUMENTS

| | | | | |
|---|---|---|---|---|
| 5,837,992 A | * | 11/1998 | Onozawa | 235/488 |
| 5,909,050 A | * | 6/1999 | Furey et al. | 257/531 |
| 5,946,198 A | | 8/1999 | Hoppe et al. | 361/813 |
| 6,160,526 A | * | 12/2000 | Hirai et al. | 343/895 |
| 6,180,433 B1 | * | 1/2001 | Furey et al. | 438/106 |

FOREIGN PATENT DOCUMENTS

| | | |
|---|---|---|
| EP | 0 902 472 A | 3/1999 |
| EP | 0 992 940 A | 4/2000 |
| JP | 11-279242 | 10/1999 |

* cited by examiner

Primary Examiner—Hoanganh Le
(74) Attorney, Agent, or Firm—Paul & Paul (57) ABSTRACT An antenna for a non-contact type IC card is provided.

A plane coil is formed by punching or etching a thin metal plate in such a manner that a conductor line is wound several times on substantially the same surface. The plane coil has respective terminals at innermost and outermost ends. The innermost terminal is provided with accommodation hole, in which a semiconductor element having electrode terminals is arranged. A circuit film comprises an insulating resin film and a circuit pattern formed on the insulating resin film. The circuit pattern electrically connects the electrode terminals of the semiconductor element to the terminals of the plane coil, respectively. At least one projection is integrally formed with the conductor and extending therefrom inwardly or outwardly so as not to contact an adjacent loop of the conductor line. The projection is located at any desired position to be used as a suction pad, an alignment mark or a positioning guide when said plane coil is sucked or positioned.

15 Claims, 12 Drawing Sheets

NON-CONTACT TYPE IC CARD, ANTENNA AND ANTENNA FRAME FOR IC CARD

BACKGROUND OF THE INVENTION

1. Field of the Invention

The present invention relates to an antenna for a non-contact type IC card. More particularly, the present invention relates to an antenna for a non-contact type IC card using a plane coil in which a conductor, which is formed by punching or etching a metal sheet, is wound, in substantially the same plane, a plurality of times. Also, the present invention relates to an antenna frame for a non-contact type IC card. Also, the present invention relates to a non-contact type IC card.

2. Description of the Related Art

Figure 10:
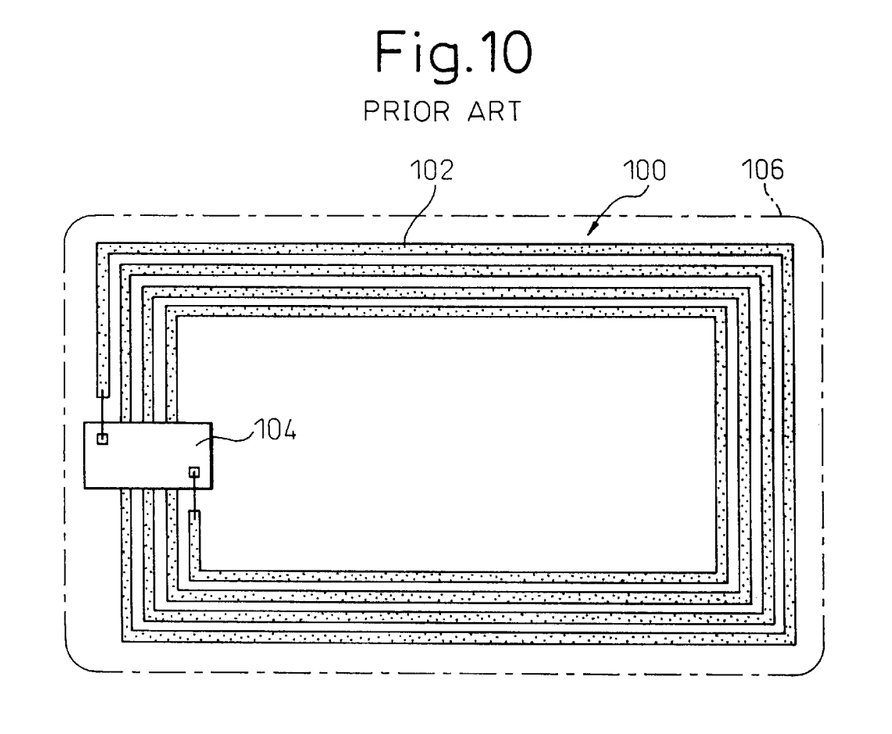
FIG. 10 is a plane view for explaining a conventional IC card.

As shown in FIG. 10, an IC card includes: a rectangular-shaped plane coil 100 in which a conductor wire 102 is wound a plurality of times; and a semiconductor element 104. The above plane coil 100 and the semiconductor element 104 are interposed between two sheets of resin films 106 made of polyvinyl chloride (PVC) on which letters and other items are printed. The two sheets of resin films 106 are made to adhere by an adhesive layer made of polyurethane resin. This adhesive layer seals the plane coil 100 and the semiconductor element 104.

When the thus formed IC card passes in a magnetic field formed by a card processor, electric power is generated, by electromagnetic induction, in the plane coil 100 of the IC card. Therefore, the semiconductor element 104 is started by the generated electric power, so that communications can be sent and received between the semiconductor element 104 of the IC card and the card processor via the plane coil 100 which functions as an antenna.

The plane coil 100 used for the above IC card is conventionally formed in such a manner that a covered electric wire is wound a plurality of times.

However, when the covered electric wire is wound so as to form the plane coil 100, it is difficult to reduce the manufacturing cost of the plane coil 100 and also it is difficult to mass-produce the plane coil 100.

Figure 11:
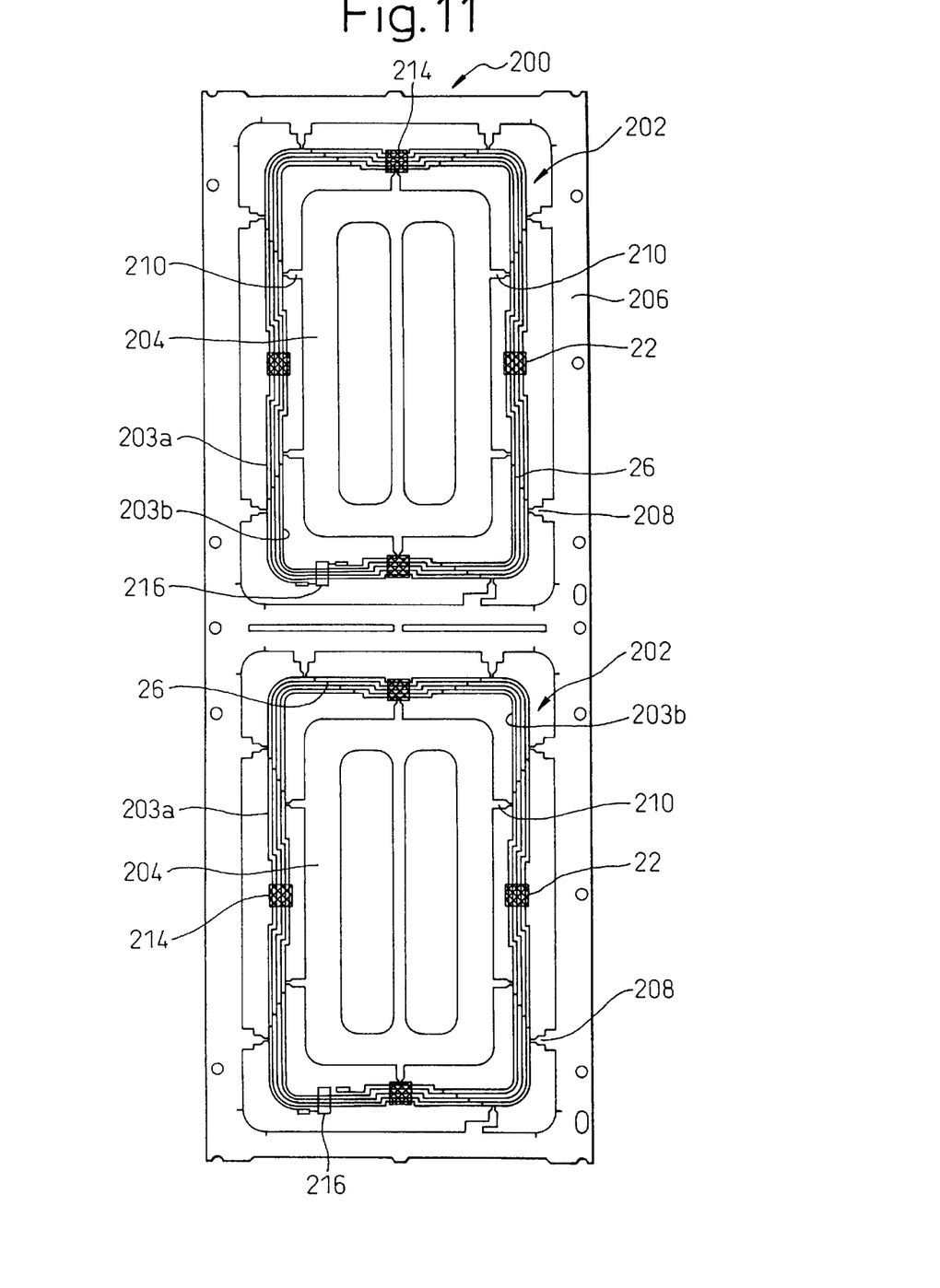
FIG. 11 is a plan view showing an example of an IC card frame used when an improved IC card is manufactured.

Therefore, in order to form a plane coil by means of punching or etching by which the plane coil can be mass-produced at low cost as compared with a plane coil formed by winding a covered wire, the present inventors proposed to use a lead frame for an IC card, which is shown in FIG. 11, in the manufacturing process of the IC card in the specification of Japanese Patent Application 11-279242.

The lead frame 200 for an IC card shown in FIG. 11 is made by etching or punching a thin metal sheet. Each plane coil 202, 202 is partially connected with the inside frame 204 and the outside frame 206 which are respectively formed inside and outside leaving a predetermined interval between the plane coil and the inside and outside frames. That is, the support sections 208, 208 extending from a plurality of positions of the inside edge of the outside frame 206 are respectively connected with the outermost conductor 203a of the plane coil 202, and the support sections 210, 210 . . . extending from a plurality of positions of the outside edge of the inside frame 204 are respectively connected with the innermost conductor 203b of the plane coil 202.

The plane coil 202 is substantially rectangular. In order to enhance the rigidity of the plane coil 202, there are provided bent sections 22, 22 . . . in each straight line sections of the plane coil 100. Further, in order to integrate the conductors 203 on the circumference of the plane coil 200 into one body so as to prevent the conductors 203 from breaking up, the conductors 203 on the circumference, which are adjacent to each other, are connected with each other by the connecting pieces 26, which are arranged at a plurality of positions.

In the case of the lead frame 200 for an IC card shown in FIG. 11, when the plane coil 202 is separated from the inside frame 204 and the outside frame 206, the support sections 208, 208 . . . , 210, 210 . . . cut off and also the connecting pieces 26, 26 . . . are cut off. After they have been cut off from the plane coil 202, the conductors 203 on the circumference of the plane coil 202 tend to break up. Therefore, in order to prevent the conductors on the circumference 203 from breaking up, a plurality of tape members 214, 214 . . . made to adhere onto the plane coil 202. In this connection, the plane coil 202 onto which the plurality of tape members 214, 214 . . . are made to adhere is electrically connected with the electrode terminal of the semiconductor element 216 and the terminal of the plane coil 202.

According to the lead frame 200 for an IC card shown in FIG. 11, when the plane coil 202 is separated from the inside frame 204 and the outside frame 206, even if the support sections 208, 208 . . . , 210, 210 . . . are cut off and also the connecting pieces 26, 26 . . . are cut off, the conductors 203 of the plane coil 202 are fixed by the tape members 214. Therefore, the conductors 203 on the circumference can be prevented from breaking up. Accordingly, the plane coil 202 can be easily handled.

However, the plane coil 202, which has been separated from the inside frame 204 and the outside frame 206 so that the plane coil 202 is simplified (this plane coil will be referred to as a "simplified plane coil"), must be interposed between two sheets of resin films, on the outer surface side of which characters are printed, so that it can be formed into an IC card. Therefore, it is necessary for the simplified plane coil 202 to be air-absorbed and/or positioned.

When consideration is given to the manufacturing cost of the IC card, it is necessary to automatize the air-absorbing and positioning work of the simplified plane coil 202. However, on the plane coil 202 shown in FIG. 11, there are provided no portions useable for air-absorbing and positioning the plane coil 202. Therefore, it is difficult to automatize the air-absorbing and positioning work of the simplified plane coil 202.

SUMMARY OF THE INVENTION

It is an object of the present invention to provide an antenna for a non-contact type IC card, an antenna frame for a non-contact type IC card, and a non-contact type IC card characterized in that the air-absorbing and positioning work for a simplified plane coil can be easily automatized.

As a result of an investigation made by the present inventors to solve the above problems, they have found that the sucking and positioning work of the simplified plane coil can be easily automated when a plurality of projecting sections are formed on the outermost or innermost conductors of the plane coil, and these projecting sections are used as suction pads or alignment marks in the case of sucking or positioning the simplified plane coil.

According to the present invention, there is provided an antenna for a non-contact type IC card, the antenna comprising: a plane coil formed by punching or etching a thin metal plate in such a manner that a conductor line is wound several times on substantially the same surface; and at least one projection integrally formed with the conductor and extending therefrom inwardly or outwardly so as not to contact an adjacent loop of the conductor line, the projection being located at any desired position to be used as a suction pad, an alignment mark or a positioning guide when the plane coil is sucked or positioned.

According to another aspect of the present invention, there is provided an antenna for a non-contact type IC card, the antenna comprising: a plane coil formed by punching or etching a thin metal plate in such a manner that a conductor line is wound several times on substantially the same surface, the plane coil having respective terminals at innermost and outermost ends, the innermost terminal is provided with accommodation hole; a semiconductor element having electrode terminals and arranged in the accommodation hole; a circuit film comprising an insulating resin film and a circuit pattern formed on the insulating resin film, the circuit pattern electrically connecting the electrode terminals of the semiconductor element to the terminals of the plane coil; and at least one projection integrally formed with the conductor and extending therefrom inwardly or outwardly, so as not to contact an adjacent loop of the conductor line, the projection being located at any desired position to be used as a suction pad, an alignment mark or a positioning guide when the plane coil is sucked or positioned.

According to a still another aspect of the present invention, there is provided an antenna frame for a non-contact type IC card, said antenna comprising: a plurality of plane coils formed by punching or etching a thin metal plate in such a manner that the plurality of plane coils are longitudinally and continuously arranged at a predetermined interval, each plane coil comprising a conductor line wound several times on a substantially same surface; a frame member partially and integrally connected to the plurality of plane coils so as to hold the latter; each of the plane coils comprising at least one projection integrally formed with the conductor and extending therefrom inwardly or outwardly, so as not to contact an adjacent loop of the conductor line, the projection being located at any desired position to be used as a suction pad, an alignment mark or a positioning guide when the plane coil is sucked or positioned.

According to a further aspect of the present invention, there is provided a non-contact type IC card comprising: a plane coil formed by punching or etching a thin metal plate in such a manner that a conductor line is wound several times on substantially the same surface; and at least one projection integrally formed with the conductor and extending therefrom inwardly or outwardly so as not to contact an adjacent loop of the conductor line, the projection being located at any desired position to be used as a suction pad, an alignment mark or a positioning guide when the plane coil is sucked or positioned.

According to a still further aspect of the present invention, there is provided a non-contact type IC card comprising: a plane coil formed by punching or etching a thin metal plate in such a manner that a conductor line is wound several times on substantially the same surface, the plane coil having respective terminals at innermost and outermost ends, the innermost terminal being provided with accommodation hole; a semiconductor element having electrode terminals and arranged in the accommodation hole; a circuit film comprising an insulating resin film and a circuit pattern formed on the insulating resin film, the circuit pattern electrically connecting the electrode terminals of the semiconductor element to the terminals of the plane coil; at least one projection integrally formed with the conductor and extending therefrom inwardly or outwardly so as not to contact an adjacent loop of the conductor line, the projection being located at any desired position to be used as a suction pad, an alignment mark or a positioning guide when the plane coil is sucked or positioned; and a pair of external films between which the plane coil is disposed together with the semiconductor element and the circuit film.

In the present invention, when the projecting sections are formed in the conductors arranged on the outermost loop and/or innermost loop composing the plane coil, the projecting sections can be easily formed.

The conductors composing the plane coil are fixed with resin, which is filled in the spaces between the adjacent conductors of the plane coil and does not protrude out from the upper and the lower surfaces of the plane coil, so that the adjoining conductors can be held at predetermined intervals. In this way, the conductors of the simplified plane coil can be prevented from breaking up and the handling property of the simplified plane coil can be enhanced. Further, resin for fixing the conductors is not protruded from the upper and the lower face of the plane coil. Therefore, even when the simplified plane coil is interposed between two sheets of resin films so as to form an IC card, it is possible to provide a thin IC card.

When the semiconductor element is arranged in a frame body which is formed by being projected onto the inside space side of the plane coil and also the electrode terminal of the semiconductor element and the terminal of the plane coil are electrically connected with the each other by wiring pattern formed on one side of the insulating resin film, the thickness of the finally obtained IC card can be reduced as compared with a case in which the electrode terminals of the semiconductor element and the terminals of the plane coil are electrically connected with each other by wires.

In this connection, in the case of positioning the plane coil by a guide pin, when a guide hole is formed in the projecting section so that at least a portion of the guide pin can be inserted into the guide hole, the simplified plane coil can be easily positioned using the guide pin.

On the plane coil used for the antenna for a non-contact type IC card, the antenna frame for a non-contact type IC card and the non-contact type IC card of the present invention, there are provided projecting sections, which project outward or inward from the plane coil, at predetermined positions of the conductors on the circumference so that the projecting sections do not come into contact with the adjacent conductors.

Therefore, in the manufacturing process of the antenna for a non-contact type IC card, the antenna frame for a non-contact type IC card and the non-contact type IC card, when the simplified plane coil is sucked and positioned, these projecting sections function as suction pads, alignment marks and positioning guides. Therefore, it becomes possible to automate the sucking and positioning operations of the simplified plane coil.

DETAILED DESCRIPTION OF THE PREFERRED EMBODIMENTS

Figure 1:
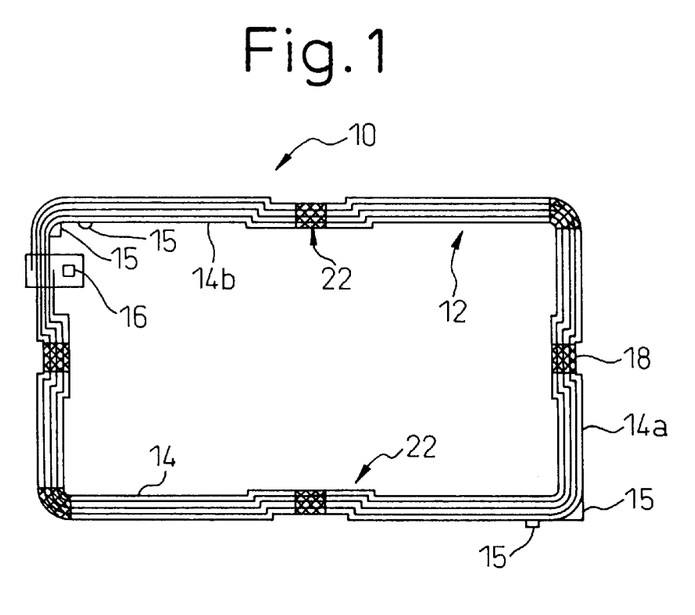
FIG. 1 is a plan view showing an antenna for a non-contact type IC card of the present invention.

FIG. 1 is a view showing an example of an antenna of a non-contact type IC card of the present invention. The plane coil 12 forming the antenna 10 for a non-contact type IC card shown in FIG. 1 is a plane coil, the plane profile of which is substantially rectangular, formed by etching or punching a thin metal sheet. The plane coil 12 is formed of a conductor 14 which is wound on substantially the same plane a plurality of times.

Thus the plane coil 12 has four corners and four straight line sections (sides). At two opposite corners of the above plane coil 12, there are provided projecting sections 15, 15 . . . which are respectively formed outside the plane coil 12 from the outermost conductor 14a and inside the plane coil 12 from the innermost conductor 14b.

Figure 2A:
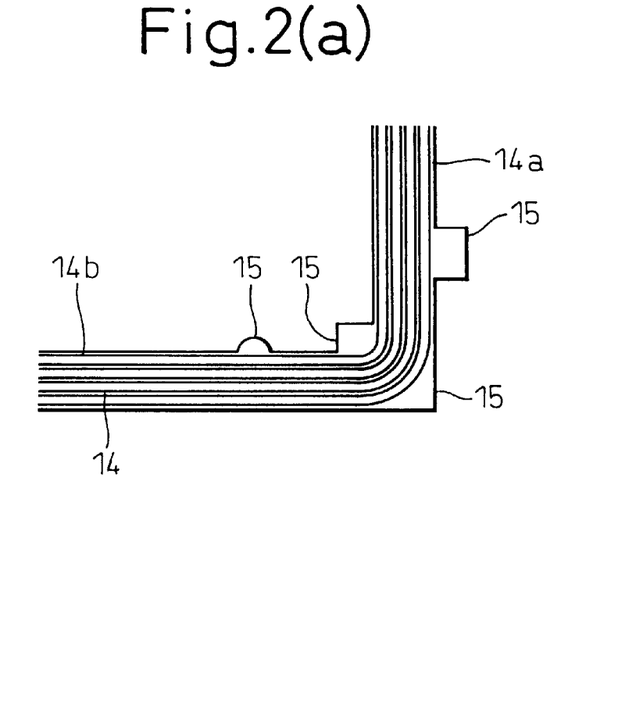
FIGS. 2(a) and 2(b) are partially enlarged views of projecting section(s) formed on a plane coil of the antenna shown in FIG. 1.
Figure 2B:
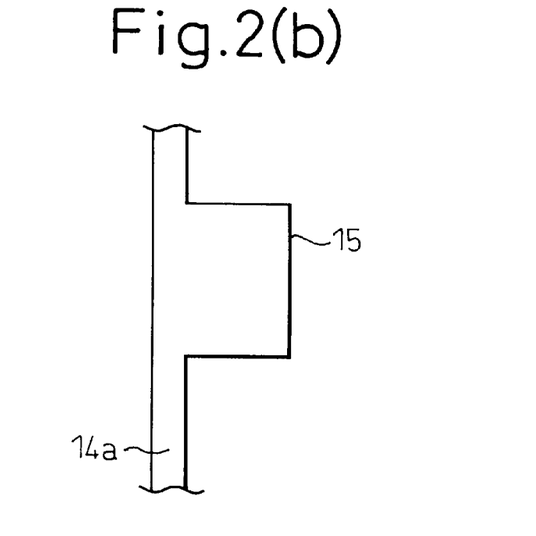

As shown in FIG. 2(a), the projecting section 15 can be formed into any desired profile such as a triangle, square or semicircle. As shown in FIG. 2(b), the projecting section 15 is made of the same material as that of the conductor 14a (or conductor 14b) and projects from the conductor 14a (or conductor 14b).

In principle, the size of the projecting section 15 is different according to the object for using the projecting section 15. For example, in the case for using the projecting section 15 as a suction pad of the simplified plane coil 10, it is necessary to adjust the size of the projecting section 15 to the size of the suction pad of the suction device. However, in the case for using the projecting section 15 as an alignment mark of the simplified plane coil 10, the size of the projecting section 15 may be smaller than that of the projecting section 15 used as a suction pad.

It should be noted, however, even when the projecting section 15 is used as a suction pad, it can also be used as an alignment mark.

Figure 3A:
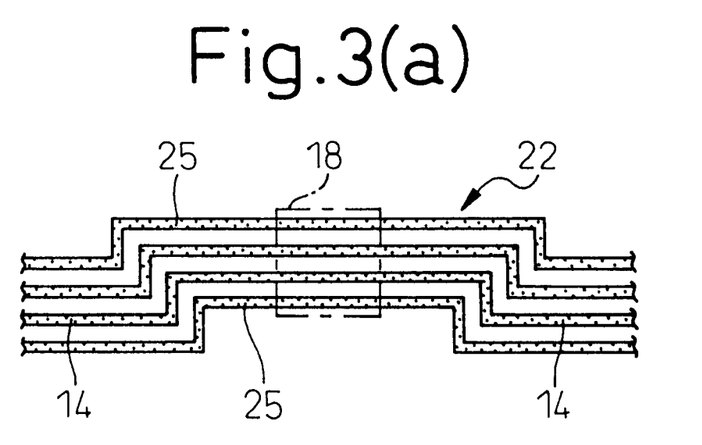
FIGS. 3(a) and 3(b) are respectively a partial plan view and a partial cross-sectional view of a plane coil shown in FIG. 1.

The plane coil 12 shown in FIG. 1 is provided with bent sections 22 in the respective four straight line sections. As shown in FIG. 3(a), this bent section 22 is formed in such a manner that the bent portion 25, which protrudes inward of the plane coil 12, is formed at the substantially same position of the conductor 14 on each circumference composing the straight line section of the plane coil 12. When this bent section 22 is formed on the plane coil 12, it is possible to enhance its rigidity. Therefore, even if the plane coil 12 is given an external force in the lateral direction when the plane coil 12 is being conveyed, it is possible to prevent the deformation of the conductors 14 composing the plane coil 12, so that the occurrence of short circuit, which is caused by contact of the adjacent conductors, can be prevented.

Figure 3B:
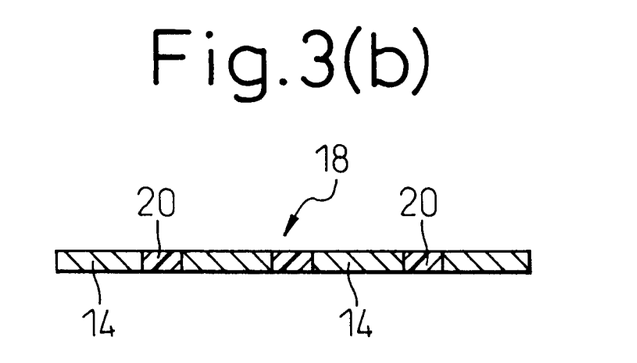

In the intermediate section of each bent section 22 and in each corner section, there is provided a resin charging section 18 so that the conductors 14, 14 . . . on the circumference can be kept in its wound state while a predetermined interval can be kept between the adjoining conductors 14. As shown in FIG. 3(b), in this resin charging section 18, the resin 20 is charged between the conductors which are adjacent to each other, so that the conductors 14, 14 . . . can be fixed by the resin 20.

The above resin 20 is charged between the conductors without protruding from the upper and the lower face of the plane coil 12. As described later, this resin 20 adheres to two sheets, of resin film, between which the plane coil 12 is interposed. Therefore, the thickness of the adhesive layer for hermetically sealing the plane coil 12 can be reduced. Accordingly, the finally obtained IC card can be made thin.

Concerning the resin 20, as described later, it is possible to use resin capable of being hardened or solidified after the resin has been charged between the conductors. It is preferable to use light-setting type resin. The reason why it is preferable to use light-setting type resin is that when the resin charged between the conductors is hardened, it is possible to harden the resin by irradiating the resin with beams of light of a specific wave-length without heating the resin. Therefore, it is possible to avoid an influence such as a thermal shock which is given to the conductors 14 made of metal when the resin is heated for hardening.

In this connection, concerning the resin 20, it is preferable to use biodegradation resin such as corn starch so that its influence given on natural environment is as small as possible.

Figure 4A:
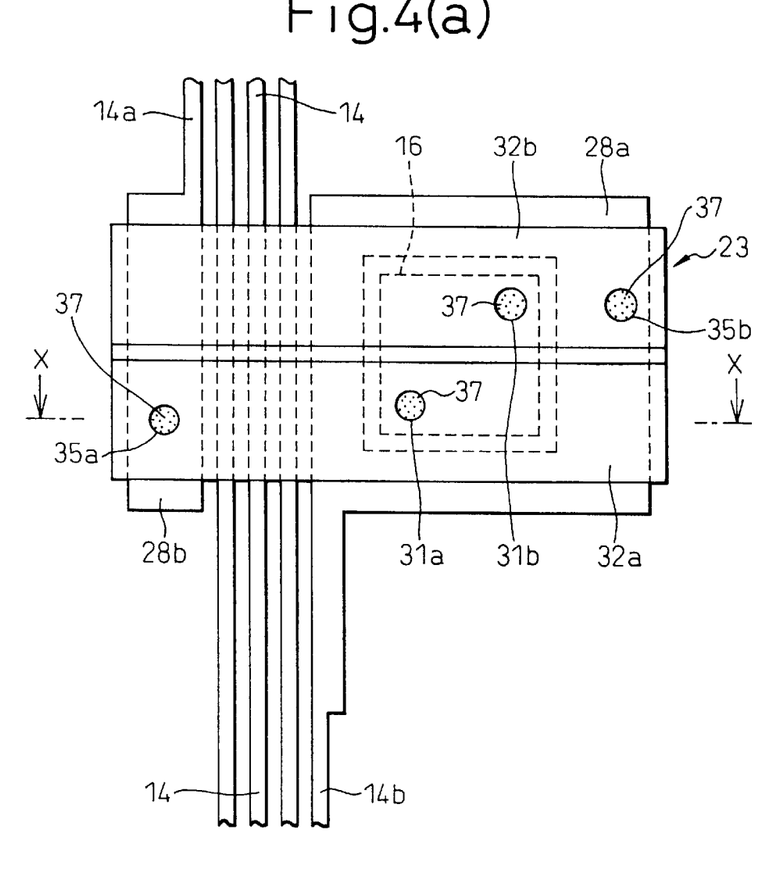
FIGS. 4(a) and 4(b) are respectively a partial back view and a partial cross-sectional view for explaining an electrical connection between terminals of a plane coil shown in FIG. 1 and electrode terminal of a semiconductor element.
Figure 4B:
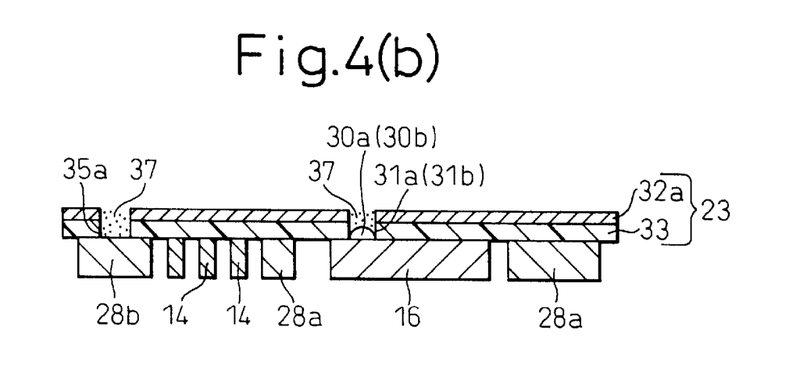

In the IC card 10 shown in FIG. 1, the terminals of the plane coil 12 and the electrode terminals of the semiconductor element 16 are electrically connected with each other as shown in FIGS. 4(a) and 4(b).

That is, the pattern film 23 is made to adhere to one sides of the frame body 28a, which is the terminal of the innermost conductor 14b of the plane coil 12, protruding onto the inner space side of the plane coil 12, and of the terminal 28b of the outermost conductor 14a of the plane coil 12. As shown in FIG. 4(b) which is a cross-sectional view taken along line X—X in FIG. 4(a), on this wiring pattern film 23, there are provided two wiring patterns 32a, 32b on the insulating resin film 33 made of adhesive resin.

In a portion of this wiring pattern film 23 in which the wiring pattern 32a is formed, there is provided a hole 31a into which the bump 30a, which is an electrode terminal of the semiconductor element 16 arranged at the center of the opening section of the frame body 28a, is inserted, and also there is provided a hole 35a, on the bottom face of which the surface of the terminal 28b of the plane coil 12 is exposed.

In a portion in which the wiring pattern 32b is formed, there is provided a hole 31b into which the bump 30b, which is an electrode terminal of the semiconductor element 16 arranged at the center of the opening section of the frame body 28a, is inserted, and also there is provided a hole 35b, on the bottom face of which the surface of the frame body 28a is exposed.

Further, conductive paste 37 is charged into the holes 31a, 31b, 35a, 35b. Therefore, the terminals of the plane coil 12 and the electrode terminals of the semiconductor element 16 are electrically connected with each other. When the wiring patterns 32a, 32b are removed and the conductive paste is coated or printing is conducted on the insulating resin film 33, the terminals of the plane coil 12 and the electrode terminals of the semiconductor elements 16 can be electrically connected with each other.

Figure 12A:
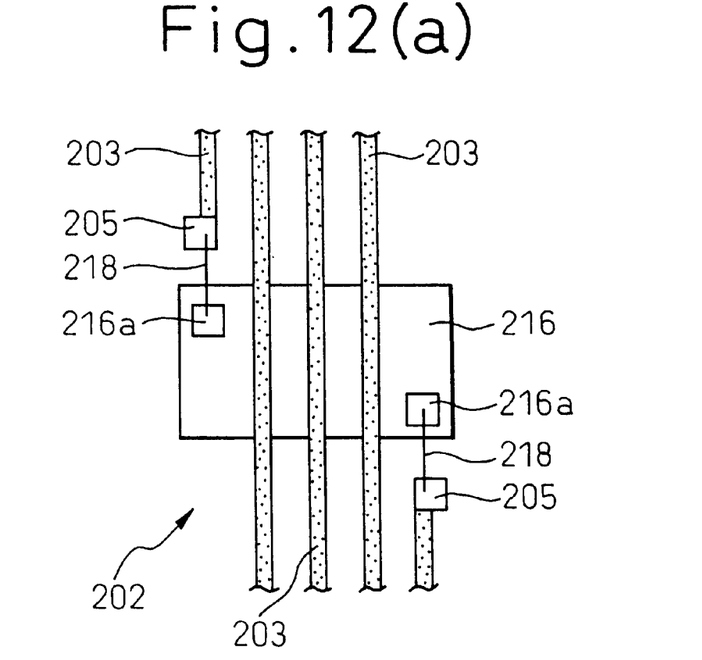
FIGS. 12(a) and 12(b) are, respectively, a partial enlarged plan view and a partial enlarged cross-sectional view of an IC card frame shown in FIG. 11.
Figure 12B:
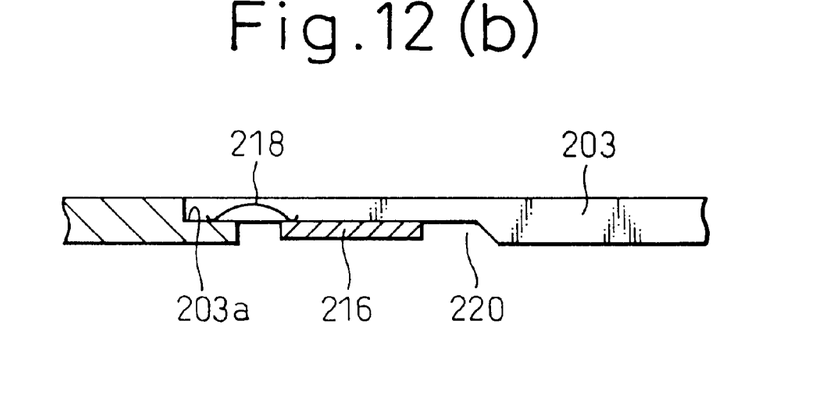

When the terminals of the plane coil 12 and the electrode terminals of the semiconductor element 16 are electrically connected with each other by the wiring patterns 32a, 32b formed on the other side of the insulating resin sheet 24 as described above, the terminal of the plane coil 12 and the electrode terminal of the semiconductor element 16 can be electrically connected with each other with ease and the finally obtained IC card 10 can be made thin, as compared with a case in which the semiconductor element 216 is arranged in the recess 220 formed on the lower side of the conductors 203, 203 . . . on the circumference of the plane coil 202 as shown in FIG. 12, and the electrode terminals 216a, 216a of the semiconductor element 216 and the terminals 205, 205 of the conductor 203 are electrically connected with each other by the wires 218, 218.

Figure 5:
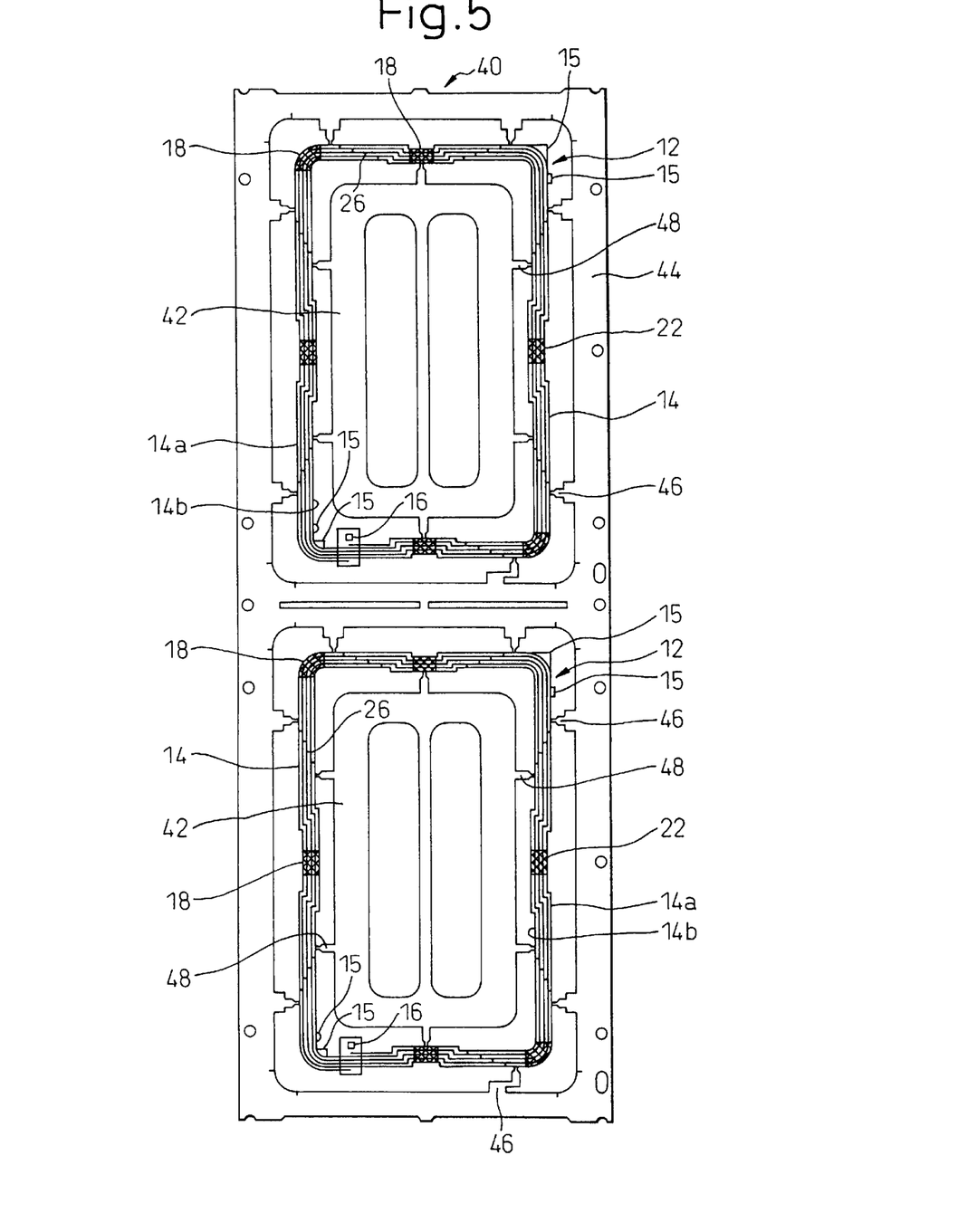
FIG. 5 is a plan view showing a frame for an IC card used when an antenna for a non-contact type IC card shown in FIG. 1 is manufactured.

It is preferable that the antenna 10 for a non-contact type IC card shown in FIG. 1 is manufactured via an IC card frame 40 shown in FIG. 5. The IC card frame 40 shown in FIG. 5 is made by etching or punching a thin metal sheet. Each plane coil 12, 12 is partially connected with the inside frame 42 and the outside frame 44 which are respectively formed inside and outside leaving a predetermined interval between the plane coil and the inside and outside frames. That is, the support sections 46, 46 . . . extending from a plurality of positions of the inside edge of the outside frame 44 are respectively connected with the outermost conductor 14a of the plane coil 12, and the support sections 48, 48 . . . extending from a plurality of positions of the outside edge of the inside frame 42 are respectively connected with the innermost conductor 14b of the plane coil 12.

Further, at two corners of the above plane coil 12, there are provided two projecting sections 15, 15 . . . which are respectively formed outside the plane coil 12 from the outermost conductor 14a and inside the plane coil 12 from the innermost conductor 14b. This projecting section 15 can be formed into any desired profile such as a triangle, square or semicircle.

This projecting section 15 can be formed simultaneously with the conductor 14 when the metal sheet is etched or punched.

Concerning an IC card frame 40 shown in FIG. 5, when the plane coil 12 and the frame, which is formed leaving predetermined intervals, are partially connected with each other so as to support the plane coil 12 by the frame, it is possible to enhance the handling property of the plane coil when it is conveyed or accommodated.

The metal sheet to be etched or punched in the manner described above may be a sheet made of metal such as copper, iron and aluminum or an alloy containing the above metals. Especially when a metal sheet made of iron or aluminum is used, it is possible to reduce the manufacturing cost of the plane coil.

In this connection, on the plane coil 12 of the IC card frame 40 shown in FIG. 5, the electrode terminals of the mounted semiconductor element 16 and the terminals of the plane coil 12 are electrically connected with each other. However, the detail of the electrical connection between them has already been explained with reference to FIGS. 4(*a*) and 4(*b*). Therefore, an explanation will be omitted here.

Figure 6A:
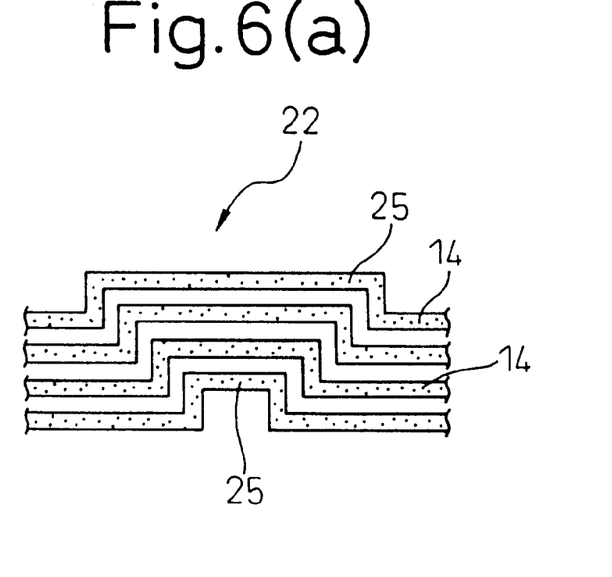
FIGS. 6(a) and 6(b) are partial plan views of an IC card shown in FIG. 5.

The plane coil 12 formed in the IC card frame 40 shown in FIG. 5 is rectangular. On this plane coil 12 formed in the IC card frame 40, there is provided a bent section 22 in each straight line section. As shown in FIG. 6(*a*), this bent section 22 is formed in such a manner that the bent portion 25, which protrudes to the inside of the plane coil 12, is formed at substantially the same position of the conductor 14 on each circumference composing the straight section of the plane coil 12. When this bent section 22 is formed on the plane coil 12, it is possible to enhance its rigidity. Therefore, even if the plane coil 12 is given an external force in the lateral direction when the plane coil 12 is being conveyed, it is possible to prevent the deformation of the conductors 14 composing the plane coil 12, so that the occurrence of short circuit, which would be caused by contact between the conductors, can be prevented.

In the case where a metal sheet is subjected to punching so as to form the plane coil 12, a punch used for punching out an interval between the conductors composing the plane coil becomes long and slender, and the rigidity of the punch could be decreased. For the above reasons, there is a possibility that the punch is damaged in the punching operation and the thus formed conductor may be twisted. In order to solve the above problems, when the bent portion 24 is formed in each conductor 14, the bent portion must also be formed in the punch following the profile of the conductor 14. Due to the foregoing, the rigidity of the punch can be enhanced. Therefore, it is possible to prevent the punch from being damaged in the process of a punching operation, and further it is possible to prevent the conductor 14 from being twisted.

Figure 6B:
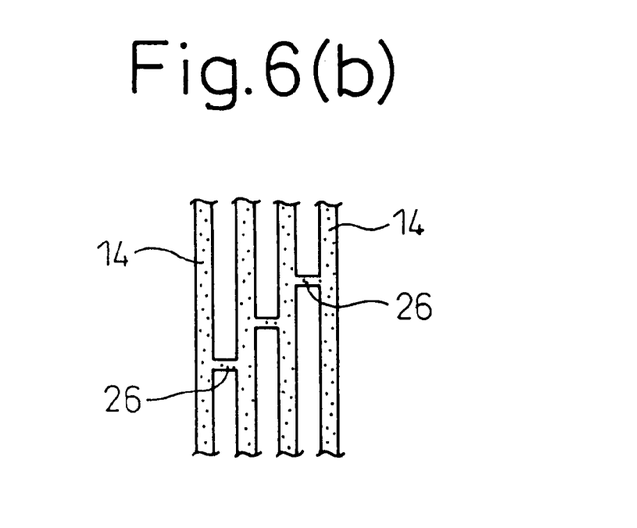

On the plane coil 12 shown in FIG. 5, there are provided a plurality of connecting pieces 26 for connecting the conductors 14 which are adjacent to each other, as shown in FIG. 6(*b*). By these connecting pieces 26, 26 . . . , the conductors 14 on the circumference can be prevented from breaking up. Therefore, when a plurality of frames 40 used for IC cards are laminated and accommodated, it is possible to prevent the deformation of the conductors 14 which is caused when the conductors 14 become entangled with the conductors 14 of another plane coil 12.

When these connecting pieces 26, 26 . . . are formed step-like between the conductors 14 on the circumference as shown in FIG. 6(*b*), it becomes easy to conduct punching on the connecting pieces 26, 26 . . . by using a cutting punch. Further, it becomes possible to enhance the mechanical strength of the cutting punch. The reason why the mechanical strength of the punch is enhanced is described as follows. Usually, the connecting pieces 26, 26 . . . are simultaneously cut off. Therefore, when the connecting pieces 26, 26 . . . are arranged on a straight line, the cutting punch is formed into a comb-tooth-shape. Accordingly, it is difficult to make the cutting punch, and the mechanical strength of the cutting punch is decreased. However, when the connecting pieces 26, 26 . . . are formed step-like as shown in FIG. 6(*b*), the position of each punch blade for cutting can be shifted according to the positions at which the connecting pieces 26, 26 . . . are formed. Therefore, the cutting punch can be easily made, and the mechanical strength of the cutting punch can be enhanced.

In this connection, the connecting pieces 26, 26 . . . are cut off by the sealing process for sealing the plane coil 12 described later, so that a predetermined interval is formed between the conductors 14 on the circumference.

In the case of the IC card frame 40 shown in FIG. 5, when the IC card 10 is formed by interposing the plane coil 12 between two sheets of resin films 24, 24, it is necessary to cut off the support sections 46, 46 . . . and 48, 48 . . . and the connecting pieces 26, 26 . . . so as to separate the plane coil 12 from the IC card frame 40. (the inside frame 42 and the outside frame 44)

On the simplified plane coil 12, which was simplified when it is cut off from the IC card frame 40, the bent sections 22, 22 . . . are formed. Therefore, the rigidity of the simplified plane coil 12 is increased, however, it is impossible to sufficiently prevent the conductors 14 from breaking up.

In order to sufficiently prevent the conductors 14 from breaking up, in the IC card frame 40 shown in FIG. 5, the resin charging sections 18, 18 . . . are formed in the intermediate sections of the bent sections 22, 22 . . . and the corner sections. As shown in FIG. 3(b), the resin in the resin charging section 18 is solidified while the resin 20 is not being protruding from the upper and the lower face of the plane coil 12.

Figures 7A, 7B, 7C:
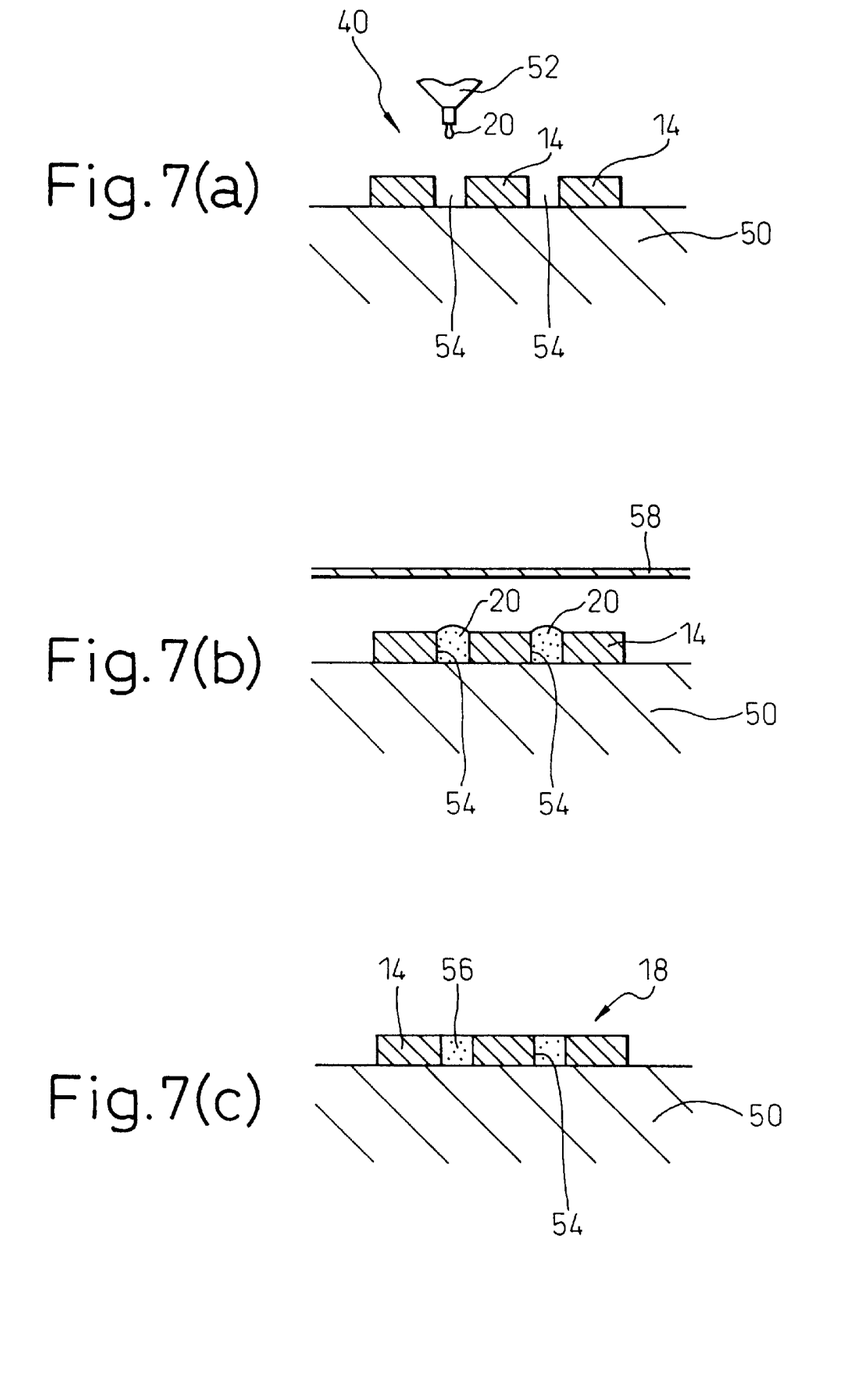
FIGS. 7(a) to 7(c) are schematic illustrations for explaining a method of charging resin between conductors of a plane coil of an IC card shown in FIG. 5.

In order to form the resin charging section 18 which is solidified while the resin 20 is not protruding from the upper and lower face of the plane coil 12, as shown in FIG. 7(a), the lower face side of the frame 40 for an IC card is put on the flat table 50, and the fluid resin 20 is poured between the conductors 54, 54 . . . at predetermined positions on the plane coil 12 by a dispenser 52. The resin 20, which has been poured into the spaces between the conductors 54, 54 . . . , swells from the upper face of the plane coil 12 by the surface tension as shown in FIG. 7(b). In this case, after the film 58 has been covered on the upper face of the plane coil 12 as shown in FIG. 7(b) so that the upper face of the resin 20 can be made to be the same face as that of the plane coil 12, the resin 20 is solidified or hardened.

When the resin 20 is solidified or hardened as described above, the resin 20 of the resin charging section 18 can be solidified or hardened while it is not protruding from the upper and the lower face of the plane coil 12.

Examples of the usable resin 20 are: thermo-plastic resin, thermo-setting resin and light-setting resin. It is most preferable to use light-setting type resin. The reason why it is preferable to use light-setting type resin is that when the resin 20 made of light-setting resin charged between the conductors is hardened, it is possible to harden the resin 20 by irradiating a beam of light of a specific wave-length without heating the resin. Therefore, it is possible to avoid an influence, such as a thermal shock, being given to the plane coil 12 when the resin is heated for hardening.

In the case where light-setting resin is used as the resin 20, after the film 58 has been covered and the upper face of the resin 20 has been made to be the same face as that of the plane coil 12 as shown in FIG. 7(b), it is preferable that a transparent film is used as the film 58 and a beam of light is irradiated through the transparent film when the resin 20 is to be hardened.

The forming of the resin charging section 18 may be conducted at any time before the plane coil 12 is separated from the IC card frame 40, however, it is preferable that the forming of the resin charging section 18 is conducted after the semiconductor element 16 has been mounted and before the plane coil 12 is separated from the frame 40.

However, in the case where light-setting resin is used as the resin 20 and there is a possibility that the semiconductor element 16 is damaged by ultraviolet rays used for hardening light-setting resin, it is preferable that the semiconductor element 16 is mounted after the resin charging section 18 made of light-setting resin has been formed.

In this connection, unless the resin 20 is protruded from the upper and the lower face of the plane coil 12 in the case where the resin 20 is solidified or hardened, the surface of the resin 20, which has been contracted to be solidified or hardened, may become concave.

Even after the support sections 46, 46 . . . , 48, 48 and the connecting pieces 26, 26 . . . of the IC card frame 40 shown in FIG. 5 are cut off so that the simplified plane coil 12, on which the semiconductor element 16 is mounted, is separated from the IC card frame 40, the simplified plane coil 12 is still provided with the bent sections 22, 22 . . . and the resin charging sections 18, 18 . . . . Therefore, the conductors 14 can be prevented from breaking up and, further, the conductors 14 can be prevented from being deformed.

In addition, at two positions on the simplified plane coil 12, there are provided projecting sections 15, 15 . . . which are formed to project from the outermost conductor 14a to the outside of the plane coil 12 and from the innermost conductor 14b to the inside of the plane coil 12. Therefore, when the simplified plane coil 12 is sucked and positioned, the projecting sections 15, 15 . . . can be used as suction pads, alignment marks or positioning guides. For example, as shown in FIG. 8, it is possible to automatically put the simplified plane coils 12, 12 . . . on the conveyer 68 moving in the direction of arrow B so as to move the plane coils 12, 12 . . . to the next process.

Figure 8:
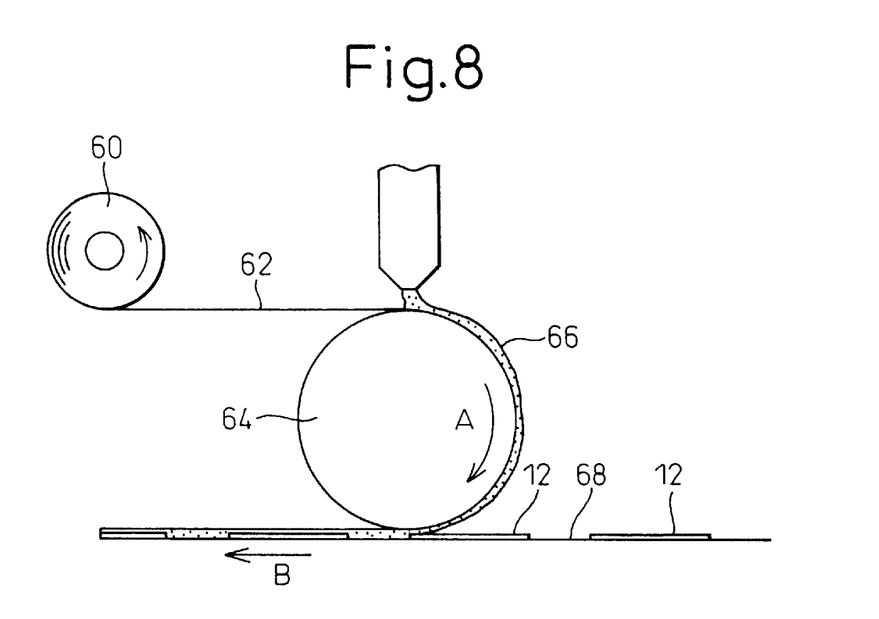
FIG. 8 is a schematic illustration for explaining an adhesion device for making a film adhere onto a simplified plane coil.

In this connection, in the process shown in FIG. 8, IC cards are formed when protective films, on which printing can be conducted, are made to adhere onto both faces of the plane coil 12.

In the process shown in FIG. 8, while the film 62 made of polyethylene terephthalate (PET) or polyvinyl chloride (PVC), which has been drawn out from the roll 60, is being wound around a half circumference of the drum 64 rotating in the direction of arrow A, the hot-melt resin 66, which is heated and provided with an adhesion property, is coated on one side (surface side) of the film 62 made of PET or PVC.

On the other hand, the plane coils 12, 12 . . . are put on the conveyer 68 moving in the direction of arrow B. When the plane coils 12, 12 . . . pass below the drum 64, the PET film 62 is made to adhere onto one side of each plane coil by the hot-melt resin 66 which exhibits the adhesion property when it is heated. Further, the plane coil 12, on one side of which the PET film 62 is already adhered by the hot-melt adhesive agent 66, is put on the conveyer 68 in such a manner that the other side of the plane coil 12, on which the PET film 62 is not yet adhered, is set upward. Then, the PET film 62 is made to adhere onto the other side of the plane coil 12 by the hot-melt adhesive agent 66. In this way, the PET films 62 can be made to adhere onto both sides of the plane coil 12.

When the plane coils 12 are cut off at appropriate positions, it is possible to obtain IC cards, on both sides of which the PET films 62 adhere.

Figure 9A:
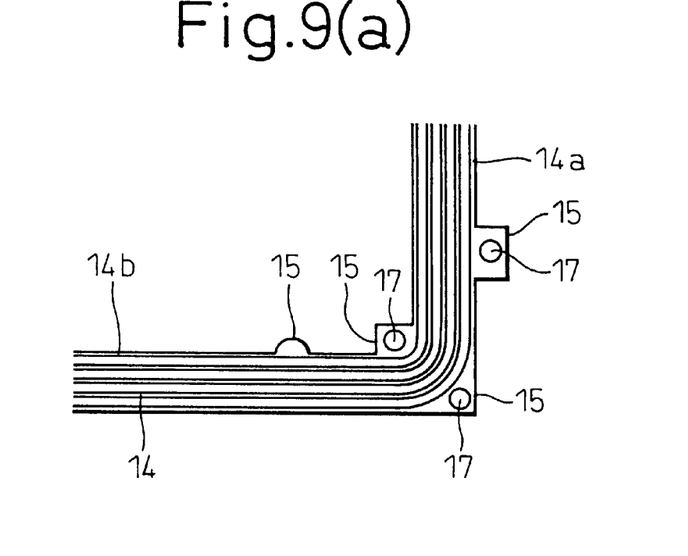
FIGS. 9(a) and 9(b) are partial enlarged views for explaining another example of projecting section(s) formed on a plane coil shown in FIG. 1.
Figure 9B:
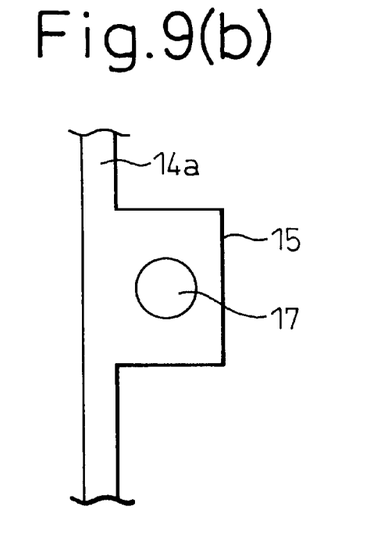

In the explanations of the embodiments shown in FIGS. 1 to 8, the projecting sections 15, 15 . . . formed at two positions on the simplified plane coil 12 are formed into a sheet-shape. However, it is possible to use the projecting section 15, at the center of which the guide hole 17 is formed as shown in FIGS. 9(a), 9(b). The diameter of this guide hole 17 is determined so that at least a portion of a guide pin (not shown) for positioning the plane coil can be inserted.

In FIG. 5, the terminals of the plane coil 12 and the electrode terminals of the semiconductor element 16 are electrically connected with each other under the condition that the plane coil 12 is supported by the IC card frame 40, however, it is also possible to electrically connect the terminals of the plane coil 12 with the electrode terminals of the semiconductor element 16 after the plane coil 12 has been separated from the IC card frame 40. Even on the plane coil 12 which has been simplified by cutting off from the frame 40 for an IC card, a plurality of projecting sections 15, 15 . . . are formed on the outermost conductor 14a and/or the innermost conductor 14b. Therefore, the plane coil 12 can be easily sucked and positioned even in the case of the plane coil 12 which has been simplified by cutting off from the frame 40 for an IC card.

Further, the resin 20 for fixing the conductors 14 onto the plane coil 12 is charged between the conductors 54, 54 . . . at predetermined positions on the plane coil 12, however, it is possible to charge the resin 20 between all the conductors on the plane coil 12. When the resin 20 is charged between all the conductors on the plane coil 12, it is possible to prevent the plane coil 12 from corroding.

According to the present invention, when the simplified plane coil is sucked and positioned, the projecting sections formed at the predetermined positions on this simplified plane coil function as suction pads, alignment marks and positioning guides. Therefore, it is possible to automate the sucking and positioning work of the simplified plane coil. As a result, it becomes possible to automate the manufacturing process of plane coils. Accordingly, the IC card can be mass-produced and the manufacturing cost can be reduced.

What is claimed is:

1. An antenna for non-contact type IC card, said antenna comprising:
    a plane coil formed by punching or etching a thin metal plate in such a manner that a conductor line is wound several times on substantially the same surface, said metal plane coil including an antenna frame member whereby said metal plane coil is connected to said metal frame member by supporting sections, said supporting sections being cut-off therefrom; and
    at least one projection integrally formed with said conductor and extending therefrom inwardly or outwardly so as not to contact an adjacent loop of said conductor line, said projection being located at any desired position and used as a suction pad, an alignment mark or a positioning guide when said plane coil is sucked or positioned.

2. The antenna, as set forth in claim 1, wherein said projection is located at an outermost loop of conductor or an innermost loop of conductor of said plane coil.

3. The antenna, as set forth in claim 2, wherein said projection located at the outermost loop of conductor or the innermost loop of conductor extends outwardly or inwardly, respectively.

4. The antenna, as set forth in claim 1, wherein at least one of said projections is provided with a guide hole into which a guide pin can be inserted when a positioning operation of said plane coil is carried out using said guide hole.

5. The antenna, as set forth in claim 1, wherein said plane coil has a substantially rectangular shape having four corners, and said at least one projection is located at an outermost loop of conductor or an innermost loop of conductor at one of said four corners or in the vicinity of said one corner.

6. The antenna, as set forth in claim 1 further comprising a resin which is charged in spaces between said adjacent loops of conductor so as not to protrude upward or downward from upper and lower surfaces of the plane coil, respectively, so that said spaces are maintained as a predetermined distance.

7. An antenna for non-contact type IC card, said antenna comprising:
    a plane coil formed by punching or etching a thin metal plate in such a manner that a conductor line is wound several times on substantially the same surface, said metal plane coil including an antenna frame member whereby said metal plane coil is connected to said metal frame member by supporting sections, said supporting sections being cut-off therefrom, said plane coil having respective terminals at innermost and outermost ends, and having an accommodation hole, said innermost end terminal being provided with accommodation terminals and arranged in said accommodation hole;
    a semiconductor element having electrode terminals and arranged in said accommodation hole;
    a circuit film comprising an insulating resin film and a circuit pattern formed on said insulating resin film, said circuit pattern electrically connecting said electrode terminals of the semiconductor element to said terminals of the plane coil; and
    at least one projection integrally formed with said conductor and extending therefrom inwardly or outwardly so as not to contact with an adjacent loop of said conductor line, said projection being located at any desired position to be used as a suction pad, an alignment mark or a positioning guide when said plane coil is sucked or positioned.

8. The antenna, as set forth in claim 7, wherein said projection is located at an outermost loop of conductor or an innermost loop of conductor of said plane coil.

9. The antenna, as set forth in claim 8, wherein said projection located at the outermost loop of conductor or the innermost loop of conductor extends outwardly or inwardly, respectively.

10. The antenna, as set forth in claim 7, wherein at least one of said projections is provided with a guide hole into which a guide pin can be inserted when a positioning operation of said plane coil is carried out using said guide hole.

11. The antenna, as set forth in claim 7, wherein said plane coil has a substantially rectangular shape having four corners, and said at least one projection is located at an outermost loop of conductor or an innermost loop of conductor at one of said four corners or in the vicinity of said one corner.

12. The antenna, as set forth in claim 7, further comprising a resin which is filled in spaces between said adjacent loops of conductor so as not to protrude upward or downward from upper and lower surfaces of the plane coil, respectively, so that said spaces are maintained at a predetermined distance.

13. An antenna frame for a non-contact type IC card, said antenna comprising:
    a plurality of plane coils formed by punching or etching a thin metal plate in such a manner that said plurality of plane coils longitudinally and continuously arranged at a predetermined interval, each plane coil comprising a conductor line wound several times on a substantially same surface;
    a frame member partially, integrally connected to said plurality of plane coils so as to hold the latter, each of said plurality of plane coils being connected to said frame member by means of supporting sections;
    each of said plane coils comprising at least one projection integrally formed with said conductor and extending therefrom inwardly or outwardly so as not to contact an adjacent loop of said conductor line, said projection being located at any desired position to be used as a suction pad, an alignment mark or a positioning guide when said plane coil is sucked or positioned.

14. A non-contact type IC card comprising:

a plane coil formed by punching or etching a thin metal plate in such a manner that a conductor line is wound several times on substantially the same surface, said metal plane coil also including an antenna frame member and being connected to said antenna frame member by means of supporting sections and cut-off portions therefrom; and at least one projection integrally formed with said conductor; and extending therefrom inwardly or outwardly so as not to contact with an adjacent loop of said conductor line, said projection being located at any desired position to be used as a suction pad, an alignment mark or a positioning guide when said plane coil is sucked or positioned.

15. A non-contact type IC card comprising:

a plane coil formed by punching or etching a thin metal plate in such a manner that a conductor line is wound several times on substantially the same surface, said metal plane coil also including an antenna frame member and being connected to said antenna frame member by means of supporting sections and cut-off portions therefrom, said plane coil having respective terminals at innermost and outermost ends, said innermost terminal is provided with accommodation hole;

a semiconductor element having electrode terminals and arranged in said accommodation hole;

a circuit film comprising an insulating resin film and a circuit pattern formed on said insulating resin film, said circuit pattern electrically connecting said electrode terminals of the semiconductor element to said terminals of the plane coil;

at least one projection integrally formed with said conductor and extending therefrom inwardly or outwardly so as not to contact an adjacent loop of said conductor line, said projection being located at any desired position to be used as a suction pad, an alignment mark or a positioning guide when said plane coil is sucked or positioned; and a pair of external films between which said plane coil is disposed together with said semiconductor element and said circuit film.

* * * * *